Oct. 13, 1936.  P. DUNSHEATH  2,057,562
ELECTRIC CABLE
Filed June 8, 1935
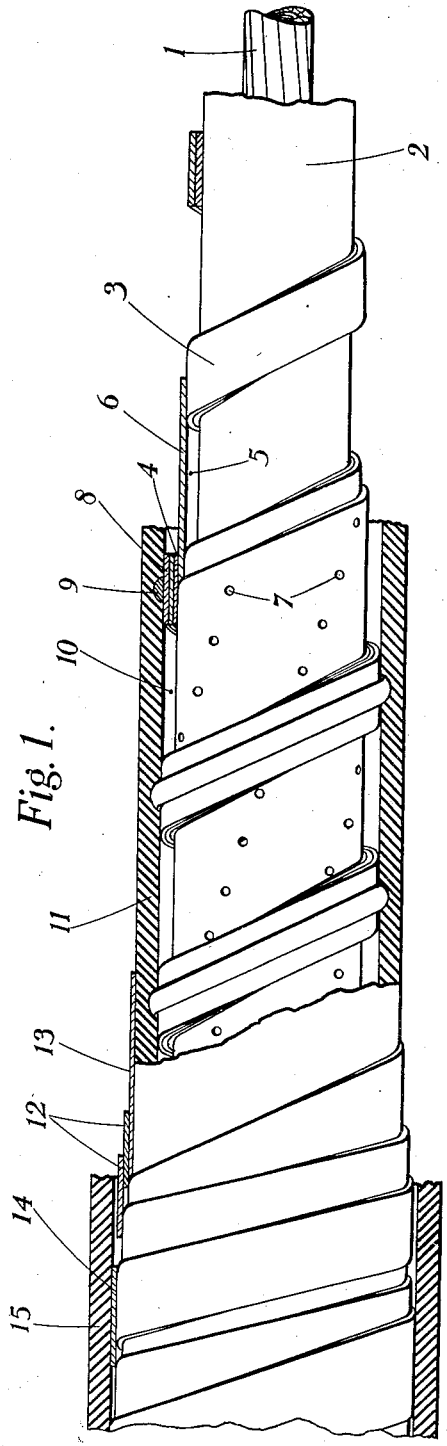
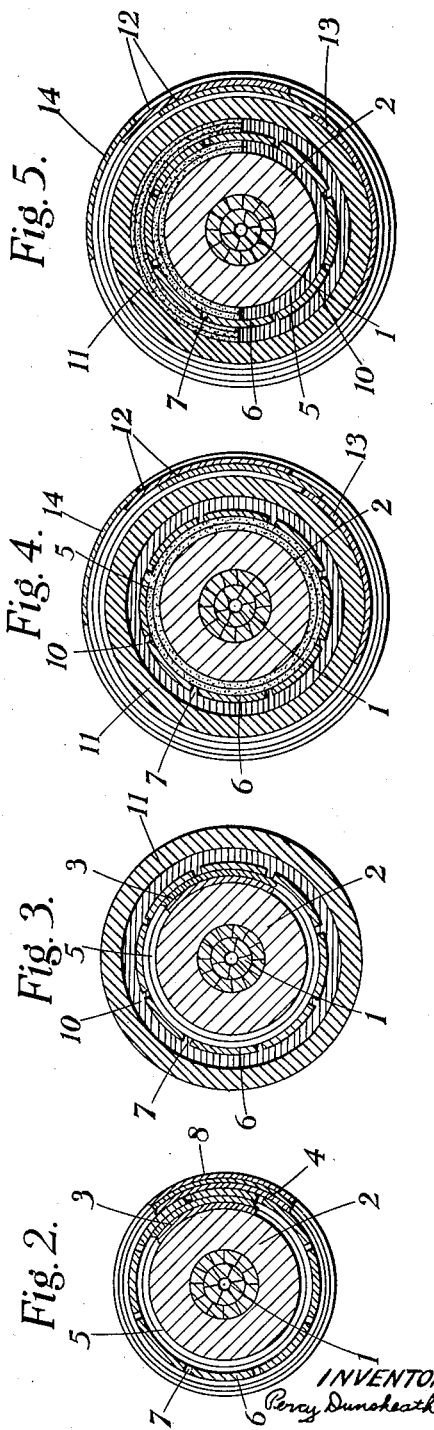

Patented Oct. 13, 1936

2,057,562

UNITED STATES PATENT OFFICE 2,057,562

ELECTRIC CABLE

Percy Dunsheath, Kent, England, assignor to W. T. Henley's Telegraph Works Company Limited, London, England, a British company Application June 8, 1935, Serial No. 25,610
In Great Britain June 20, 1934

11 Claims. (Cl. 173—266)

In the specification of application No. 667,207 which has matured to Patent No. 2,052,922 dated Sept. 1, 1936 is described a type of electric cable having the dielectric formed of superposed layers of impregnated paper and containing compressed gas serving to accommodate the expansion and contraction of the impregnating compound, this gas being in direct contact with the dielectric spaces of relatively short longitudinal extent in which it is screened from electric stress. Forms of cable of this type are there described in which the compressed gas cushions are located between the dielectric and the sheath in an annular space which is sub-divided by a spacing strip which is coiled round the dielectric in an open helix. In one method of manufacture of such a cable, the spaces between the turns of this strip are in continuous communications through the length of the cable or an appropriate portion until these spaces have been charged with gas under pressure either from the ends of the length of cable or from openings in the sheath at intermediate points. After this charging has been carried out, the communication between the spaces is cut off by means of bodies of solidified or highly viscous compound, each of which occupies a part of a space between a pair of adjacent turns.

The present invention relates to the improved manufacture of a cable of the type referred to, relating particularly to the structure and method of use of the spacing strip and the adjacent part of the cable in which the gas cushions are formed.

In this improved manufacture, the spacing strip, which is preferably built up of a number of layers, is secured in position by a metal tape applied with considerable tension on the outside of the strip and having on its exterior surface a layer of solder by which the metal strip is united to the sheath when this is applied. By this means, the strip itself is made impermeable to the compressed gas and the joint between the strip and the sheath is made gas tight and in such a form that it retains its tightness when the cable is handled.

The compound, which is to be liberated after the cable has been charged with compressed gas, is carried outside the dielectric preferably in a continuous layer, being retained there by adhesion or by the effect of viscosity, and occupying only a portion of the space between the dielectric and the sheath such that it does not obstruct the longitudinal flow of gas. It is liberated, after the charging has been completed, by heating the cable so as to cause this compound to run down into the lower part of the cable filling a section of the annular space between each pair of adjacent turns of the spacing strip.

The improved manufacture is illustrated by and will be further described with reference to the accompanying drawing which indicates one manner of carrying out the invention. In the drawing, Figure 1 is a longitudinal view with parts in section and with outer layers removed progressively in passing along the figure from right to left. Figures 2, 3, 4, and 5 are transverse views, each illustrating a different stage in the manufacture.

It will be understood that the drawing is only diagrammatic and is not drawn to scale. It has been necessary to exaggerate the thickness of certain parts in relation to others in order to show the structure clearly.

The conductor 1 is built up of sector shaped wires round a central circular wire so as to produce a conductor without any substantial spaces between wires along which the impregnating material could travel freely. This conductor is covered with the paper dielectric 2 in the usual way and this is impregnated. The outer layer of the dielectric is provided with a conductive covering in the usual way to serve as an equi-potential surface and screen.

On the outside of the dielectric is applied the helical spacing strip which consists of an inner part 3 and an outer part 4, each consisting of several layers of metallized paper strip. The inner part 3 is applied as an open spiral so as to leave a wide space 5 between the turns. On the outside of this inner part 3 is applied a wide strip of metallized paper 6. This strip (hereinafter referred to as "the barrier strip") bridges the space 5 and rests at each side on adjacent turns of the part 3 of the spacer. The strip 6 has a suitable number of small perforations 7 of such a size that viscous compound will not flow freely through them. The metallized paper strips 4, forming the outer part of the spacer, are then applied over the inner part 3 and the edges of the strip 6 so as to hold the barrier strip in place. Over the outside of the strips 4 is applied a metal tape 8 having adhering to its outer surface a strip 9 of solder. At this stage, the cable is taken to the lead press for sheathing. Immediately before entering the press, the cable passes through a bath of viscous compound so that the space 10 between the outer parts 4 of the spacer and the barrier strip 6 is filled with this compound which is carried into the press and enclosed by the sheath 11. As the sheathing takes place, the heat transferred from the lead sheath to the metal tape causes the solder 9 on the outer surface of the metal tape 8 to melt, thus uniting the tape with the lead sheath 11. It is preferable to use a solder having only a small proportion of tin and rich in lead so that the composition and physical properties of the sheath are not appreciably disturbed in the region where the soldering takes place.

The sheath 11 is then reinforced so that it can withstand internal pressure. The reinforcement consists of two layers of brass tape 12 applied over the bedding 13 of paper which lies on the sheath 11. Over the brass tape is applied compounded cotton tape 14 and then the outer lead sheath 15 is put on. This sheath serves primarily to protect the reinforcement from moisture and other influences.

The description of the manufacture requires to be expanded so as to include the method of forming the compressed gas cushions. This will now be done with the aid of Figures 2–5.

Figure 2 shows the state of manufacture arrived at before the cable is taken to the lead press for the application of the inner sheath 11. Figure 3 shows the next step in the process, that is, the cable as it comes from the lead press. The layer of compound is shown occupying the space 10 between the barrier strip 6 and the sheath 11. The inner space 5, coaxial with the outer space 10, is free of compound so that there is here a clear helical passage from one end of a length of cable to the other.

The next step in the process of manufacture is the application of the reinforcement. When this has been done, the compressed gas can be forced in from one or both ends of the length of cable and then occupies the whole of the space 5. The condition is shown in Figure 4 where the presence of compressed gas is indicated by dots in the space 5.

While still maintaining the pressure on the gas, it is necessary to sub-divide the body of gas into separate cushions. This is done by applying heat to the outside of the sheath 11 or, alternatively, by the application of current to the conductor of sufficient magnitude to raise the compound in the space 10 to the necessary temperature. Either of these methods causes the viscous compound in the space 10 to become more fluid and to pass through the holes 7 in the barrier 6 and flow down to the lower parts of the two coaxial spaces 5 and 10. This step in the manufacture is indicated by the transition from Figure 4 to Figure 5. The compound, having passed to the position shown in Figure 5, is then allowed to cool and during the rest of the life of the cable remains substantially in the position shown in that figure and serves to seal off each gas cushion from its neighbours. Each gas cushion accordingly consists of a portion of one turn of the coaxial helical spaces 5 and 10 which are in communication through the hole 7 in the barrier 6.

The volume of each gas cushion must be so chosen, in relation to the other dimensions of the cable, that the expansion of the compound within the dielectric does not produce an undesirably high value of the gas pressure in that space under the highest temperature to be reached in service. A suitable range of pressure regulation with temperature change has been found to be from 200 to 300 pounds per square inch (14 to 21 atmospheres). The principal variable dimension in the design, which affects this value, is the sum of the radial thicknesses of the spaces 5 and 10. The relation of this dimension to the radial thickness of the dielectric will depend to some extent upon the nature of the impregnating compound in the dielectric and upon the space occupied by the sealing compound. The appropriate dimensions can be calculated from the known properties of the materials. As an example, it may be stated that, with sealing compound occupying from one third to one half of the coaxial helical spaces 5 and 10, satisfactory results are obtained when the sum of the radial thicknesses of the spaces 5 and 10 is from one eighth to one tenth of the radial thickness of the dielectric 2.

It will be noted that, by building up the spacing strips 3 and 4 and the barrier strip 6 of metallized paper or equivalent conducting material, the gas cushion spaces are screened from electric stress, being surrounded by conducting surfaces having the electric potential of the sheath 11.

Other methods of carrying out the invention may be employed. In one of these, the structure of the cable may be the same as described in connection with and shown in the drawing but the procedure is such as to retain the sealing compound initially in the space 5 instead of in the space 10. This is done by leaving the cable in the state shown in Figure 2, in the impregnating compound until this has cooled down to a sufficient extent to prevent the compound from flowing out through the holes 7 in the barrier strip 6 while the compound on the outer surface of the strip will drain off. No additional compound is supplied before the sheath 11 is applied.

Instead of retaining the compound by means of a barrier, it may be held in position by being applied to fibrous material in the form of cord or strips which is wound on the cable in the spaces between the turns of spacing strip. This material is wound on so as to occupy only a portion of the available space so that charging with gas can take place. In this method, jute or hessian yarns or fabric strips or other fibrous material which can be handled in a similar manner is dried and impregnated with the assistance of heat with an appropriate compound and after cooling this is wound on in position. This is done after the impregnation of the dielectric has been completed.

In another method of applying sealing compound, the compound is applied in the form of strips of viscous material or dry powder (for example, resin) which would adhere to the outer surface of the dielectric and can be softened by heat and caused to flow to form the seals after the cable has been charged with gas.

The several methods of procedure indicated in the preceding description can be carried out completely in the factory so that the cable contains the compressed gas cushions when transported from the factory to the place at which it is laid. Alternatively, the method may be carried to a certain point at the factory and completed after the cable has been laid. In this latter alternative, the forcing in of the compressed gas and the formation of the separating seals between the cushions will not be done in the factory. The cable will be made complete, except for these two steps, and will be transported from the factory to the place in which it is to be laid, with gas at normal pressure in the available part of the gas space, which will be in the form of a continuous helix throughout the length of cable. The cable will then be laid and after this the gas will be forced in under pressure until the necessary quantity is within the cable. The seals will then be formed by heating the cable by the passage of current through the conductor. This current may be the usual working current or a heavier current sent in for a short time. The former will suffice generally since it can be continued over a fairly long period while the compound runs down very slowly into its sealing position. In other words the longer time available permits of a higher viscosity in the sealing compound and therefore permits a lower temperature to be used than in the case when carrying out the operation in the factory.

I claim as my invention:—

1. An electric cable comprising a conductor, dielectric material surrounding said conductor, a sheath enclosing said dielectric material, a spacing strip disposed in an open helix between the dielectric and the sheath, a metal tape applied to the outside of said spacing strip, a layer of solder on the outside of said metal tape, uniting the tape to the sheath, said spacing strip providing between its turns a helical space lying between the dielectric and sheath, and means for dividing this helical space into short lengths.

2. An electric cable comprising a conductor, dielectric material surrounding said conductor, a sheath enclosing said dielectric material, a spacing strip disposed in an open helix between the dielectric and the sheath, a metal tape under tension on the outside of said spacing strip compressing the strip on to the dielectric, a layer of solder on the outside of said metal tape, uniting the tape to the sheath, said spacing strip providing between its turns a helical space lying between the dielectric and sheath, and means for dividing this helical space into short lengths.

3. An electric cable comprising a conductor, dielectric material surrounding said conductor, a sheath enclosing said dielectric material, a laminated spacing strip disposed in an open helix between the dielectric and the sheath, a metal tape under tension on the outside of said spacing strip compressing the laminations of the strip tightly together and pressing the strip on to the dielectric, a layer of solder on the outside of said metal tape, uniting the tape to the sheath, said spacing strip providing between its turns a helical space lying between the dielectric and sheath, and means for dividing this helical space into short lengths.

4. An electric cable comprising a conductor, dielectric material surrounding said conductor, a sheath enclosing said dielectric material, a spacing strip disposed in an open helix between the dielectric and the sheath, a metal tape applied to the outside of said spacing strip, a layer of solder on the outside of said metal tape, uniting the tape to the sheath, said spacing strip providing between its turns a helical space lying between the dielectric and sheath, gas under super-atmospheric pressure in the said space and means dividing the space into short lengths.

5. An electric cable comprising a conductor, dielectric material surrounding said conductor, a sheath enclosing said dielectric material, a spacing strip disposed in an open helix between the dielectric and the sheath, a metal tape under tension on the outside of said spacing strip compressing the strip on to the dielectric, a layer of solder on the outside of said metal tape, uniting the tape to the sheath, said spacing strip providing between its turns a helical space lying between the dielectric and sheath, gas under super-atmospheric pressure in the said space and means dividing the space into short lengths.

6. An electric cable comprising a conductor, dielectric material surrounding said conductor, a sheath enclosing said dielectric material, a laminated spacing strip disposed in an open helix between the dielectric and the sheath, a metal tape under tension on the outside of said spacing strip compressing the laminations of the strip tightly together and pressing the strip on to the dielectric, a layer of solder on the outside of said metal tape, uniting the tape to the sheath, said spacing strip providing between its turns a helical space lying between the dielectric and sheath, gas under super-atmospheric pressure in the said space and means dividing the space into short lengths.

7. An electric cable comprising a conductor, dielectric material surrounding said conductor, a sheath enclosing said dielectric material, a spacing strip disposed in an open helix between the dielectric and the sheath, said spacing strip providing between its turns a helical space lying between the dielectric and sheath, a barrier within this helical space and permeable to cable compound when the compound is mobile and impermeable thereto when the compound is viscous, this barrier being supported by the spacing strip and dividing the space into two co-axial parts, and cable compound in said space serving for dividing it into short lengths.

8. An electric cable comprising a conductor, dielectric material surrounding said conductor, a sheath enclosing said dielectric material, a laminated spacing strip disposed in an open helix between the dielectric and the sheath, a metal tape under tension on the outside of said spacing strip compressing the laminations of the strip tightly together and pressing the strip on to the dielectric, said spacing strip providing between its turns a helical space lying between the dielectric and sheath, a barrier permeable to cable compound only when the compound is mobile, said barrier being in the form of a strip and supported by the spacing strip, the edges of the barrier strip lying between laminations of the spacing strip, said barrier dividing the helical space into two co-axial parts, and cable compound serving for dividing the helical space into short lengths.

9. An electric cable comprising a conductor, dielectric material surrounding said conductor, a sheath enclosing said dielectric material, a spacing strip disposed in an open helix between the dielectric and the sheath, said spacing strip providing between its turns a helical space lying between the dielectric and sheath, a barrier formed of a strip of material having small holes in it and supported by the spacing strip and dividing the helical space into two co-axial parts, and cable compound serving for dividing said space into short lengths.

10. A method of manufacture of an electric cable which comprises applying to the outside of the dielectric, which surrounds the conductor, a spacing strip, applying a sheath over said strip, said strip being disposed in an open helix and defining a helical space lying between the dielectric and the sheath, filling a portion of this space prior to sheathing with viscous compound located to permit longitudinal flow of gas and, after sheathing, forcing in compressed gas along the cable length to the remainder of the said space and thereafter applying heat and thereby causing the compound to run down to and collect in the lower part of the space between the adjacent turns of the helical strip, thereby dividing said space into short lengths.

11. A method of manufacture of an electric cable which comprises applying to the outside of the dielectric, which surrounds the conductor, a spacing strip, applying a sheath over said strip, said strip being disposed in an open helix and defining a helical space lying between the dielectric and the sheath, dividing this space into two co-axial parts by a barrier which is permeable to cable compound only when the compound is mobile, filling one of these co-axial parts with viscous compound and, after sheathing, forcing compressed gas along the cable length through the other of the two co-axial parts and thereafter applying heat and thereby causing the compound to run down to and collect in the lower part of the space between the adjacent turns of the helical strip, thereby dividing said space into short lengths.

PERCY DUNSHEATH.